United States Patent [19]

Robertson

[11] 4,446,927
[45] May 8, 1984

[54] GROUND PENETRATING TOOL FOR FARM IMPLEMENT SHANKS

[75] Inventor: Forrest E. Robertson, Garden City, Kans.

[73] Assignee: Acra-Plant, Inc., Garden City, Kans.

[21] Appl. No.: 356,306

[22] Filed: Mar. 1, 1982

[51] Int. Cl.³ .............................................. A01B 15/02
[52] U.S. Cl. ..................................... 172/753; 172/713; 172/719
[58] Field of Search ............... 172/713, 719, 753, 762, 172/765, 772, 772.5, 769, 770, 777, 778, 740, 708, 744, 251; 37/141, 142

[56] References Cited

U.S. PATENT DOCUMENTS

| | | | |
|---|---|---|---|
| 2,598,121 | 5/1952 | Hannibal | 111/7 |
| 2,619,054 | 11/1952 | Bell | 111/7 |
| 2,689,514 | 9/1954 | Ferguson | 172/708 |
| 2,716,823 | 9/1955 | Mullin | 172/753 |
| 2,734,439 | 2/1956 | Padrick | . |
| 2,768,591 | 10/1956 | James | 111/7 |
| 2,904,119 | 9/1959 | Hunter | 172/762 |
| 3,002,574 | 10/1961 | Padrick | 172/699 |
| 3,289,772 | 12/1966 | Blackwood | 172/251 |
| 3,517,752 | 6/1970 | Glee | 172/721 |
| 4,269,274 | 5/1981 | Robertson et al. | 172/699 |
| 4,333,536 | 6/1982 | Ryan | 172/753 |

FOREIGN PATENT DOCUMENTS

| | | | |
|---|---|---|---|
| 496012 | 9/1953 | Canada | . |
| 945183 | 4/1974 | Canada | 172/753 |
| 552793 | 11/1930 | Fed. Rep. of Germany | 172/708 |
| 657738 | 5/1929 | France | 172/708 |

Primary Examiner—Richard T. Stouffer
Assistant Examiner—William H. Honaker
Attorney, Agent, or Firm—Schmidt, Johnson, Hovey & Williams

[57] ABSTRACT

A ground penetrating tool for a farm implement shank has a pyramidal tooth provided with a pointed, leading apex and a socket in its trailing end that receives a mating, triangular tongue integral with an upwardly and rearwardly extending mount releasably secured to the shank. The trailing end of the tooth abuts shoulders on the mount to absorb the load on the tooth and further protect a fastener passing transversely through the tooth and tongue for releasably attaching the tooth to the mount.

12 Claims, 6 Drawing Figures

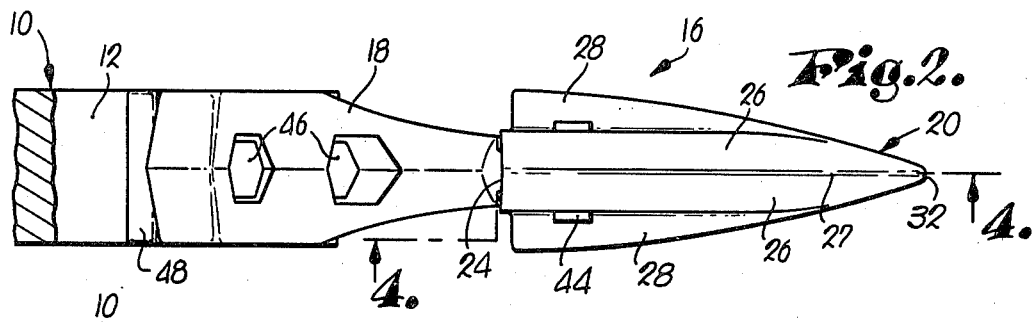
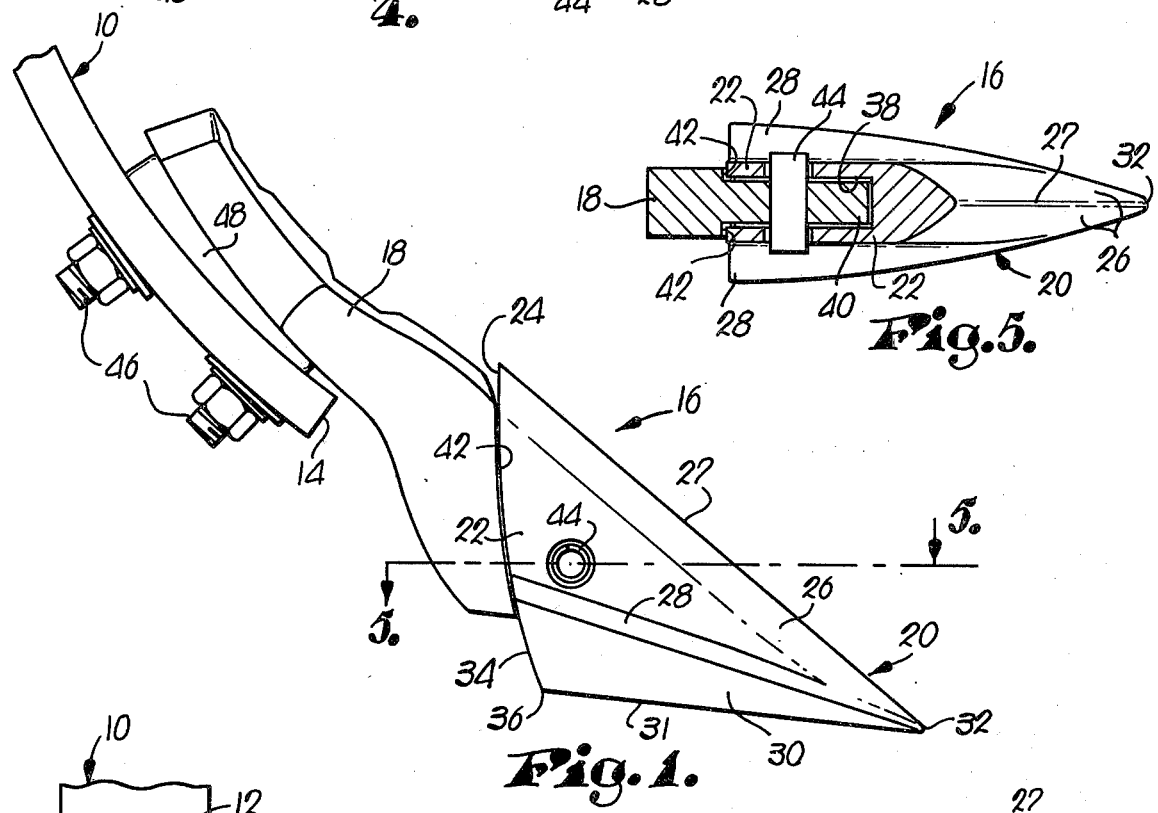
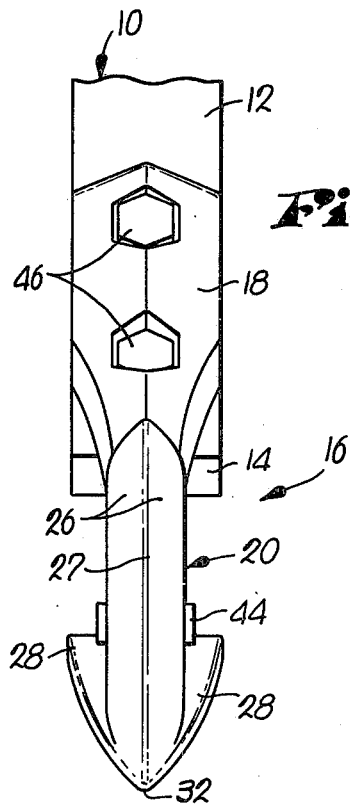
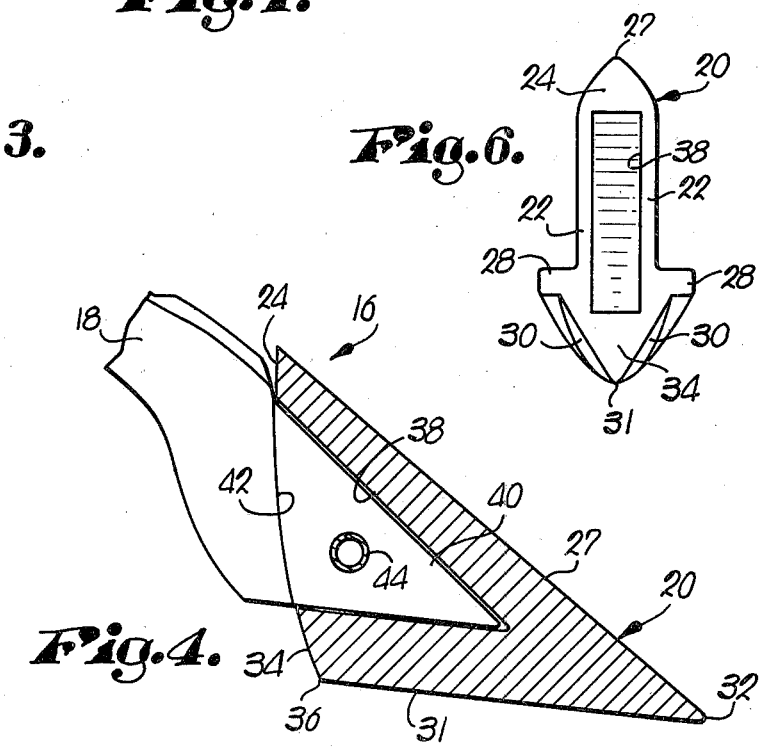

GROUND PENETRATING TOOL FOR FARM IMPLEMENT SHANKS

Ground working tools in the form of teeth are oftentimes releasably attached to tillage implement shanks to permit repair or replacement, but the problem of rendering the teeth universally adaptable for various types of shanks has not been solved in an altogether satisfactory manner. Nor has the problem of break-away of the teeth from the shanks under certain hard or rocky soil conditions been satisfactorily solved. Noreover, tooth configurations heretofore suggested have not been of such nature as to serve many of the purposes for which there is a long felt need.

Therefore, to meet the long-existing demands and to solve the continuing problems, the answers to which many others have for years sought and failed, I provide a two-piece tool, including a releasable mount adaptable for universal securement to virtually all types of shanks, and a specially configured tooth that is, in turn, releasably attached to the mount.

My pyramidal tooth has a leading, pointed apex and a socket extending into its trailing end. A triangular tongue, integral with the mount extends into and mates with the socket, providing an especially strong and durable interlock which precludes movement of the tooth relative to the mount, rotationally, or otherwise. A quick-release fastener through the tongue and the tooth is protected by shoulders on the mount abutted by the trailing end of the tooth for absorbing the thrust load to which the tooth is subjected.

In the drawings:

FIG. 1 is a side elevational view of a ground penetrating tool for farm implement shanks made in accordance with my present invention;

FIG. 2 is a top plan view thereof;

FIG. 3 is an end view thereof;

FIG. 4 is a cross-sectional view taken on line 4—4 of FIG. 2 looking in the direction of the arrows;

FIG. 5 is a cross-sectional view taken on line 5—5 of FIG. 1; and

FIG. 6 is a rear elevational view of the tooth.

A shank 10 for a farm implement, e.g. as commonly employed in chisel plows, used for tillage, planting, fertilizing, cultivating and other purposes, has an upper face 12 and a terminus 14 remote from the upper zone of joinder (not shown) of the shank 10 to the tool bar or other shank support of the implement. My ground penetrating tool 16 is releasably secured to the face 12 of the shank 10 at the terminus 14 through use of a mount 18 which, in turn, supports a releasable, pyramidal tooth 20.

The tooth 20 has a pair of opposed, flat, parallel, triangular sides 22 adjacent its trailing end 24 and a pair of opposed, upper bevels 24, presenting a straight upper edge 27, the sides 22 terminating in a pair of opposed, laterally extending, flat, triangular wings 28. Extending downwardly from the wings 28 are a pair of opposed, triangular, lower bevels 30, presenting a straight lower edge 31. The edges 27 and 31, as well as the wings 28 converge forwardly, merging into a leading, pointed apex 32, and the lower flat, triangular portion 34 of the trailing end 24 merges with the edge 31 to form a pointed corner 36.

A triangular socket 38 extends inwardly from the end 24 above its portion 34 and the mount 18 has a similarly shaped tongue 40 fitted into and mating with the socket 38. Opposed, forwardly facing shoulders 42 on the mount 18 abut the end 24. Aligned openings traversing the sides 22 and the tongue 40 receive an easily removed roll pin 44 that fits the tongue 40 tightly. The shoulders 42 absorb the thrust exerted on the tooth 20 during use, protecting the pin 44 against shearing and preventing an unduly tight wedge fit of the tongue 40 within the socket 38. The tooth 20 can, therefore, be easily and quickly removed from the mount 18 for repair or replacement.

Bolts 46 releasably secure the mount 18 to the shank 10, and an optional wedge-shaped shim 48, having openings (not shown) for receiving the bolts 46, may be removed to change the pitch or angle of attack of the tooth 20 and, therefore, its draft, i.e. the tendency of the tooth 20 to draw itself deeper into the soil.

In any event, the streamlined configuration of the tooth 20, progressively decreasing in cross-sectional area throughout as its apex 32 is approached, reduces chattering and causes the tooth 20 to move smoothly through the soil without undue load. Moreover, such special shape substantially alleviates the tendency of the tooth 20 to jump out of the ground or ride along at an unduly shallow depth, especially when subjected to hard conditions.

Important also is the fact that the tooth 20 is universally useable with shanks 10 of many types because its mount 18 can be secured to various sizes and shapes of shanks 10. Moreover, damages and wear of the tooth 20 during use is not transmitted to the more expensive shank 10 which should always be protected against breakage and bending out of shape.

By virtue of the construction and configuration of the tool 16 and the strength characteristics so resulting, it is now possible to utilize a much wider range of metal alloys including those that are relatively inexpensive, all without sacrificing durability, including the use of brittle, abrasive resistent metals not heretofore useable for ground penetrating tools of this nature.

The wings 28 contribute significantly to the draft of the tool 16; additionally, the pyramidal configuration of the tooth 20 results in uniform wear throughout as distinguished from rapid wear-away and dulling at the leading edges of the conventional ground penetrating tools. Noteworthy also is the fact that the tooth 20 parts the soil in all directions circumferentially of the tooth 20 as distinguished from the essentially up and down parting to which conventional teeth are limited.

I claim:

1. In a farm implement provided with an elongated, downwardly and forwardly inclined shank having a terminus, a ground penetrating tool for said shank, said tool comprising:

an elongated, downwardly and forwardly inclined mount having means for securing the same to the shank at said terminus with the mount extending downwardly and forwardly from the shank;

an elongated, essentially pyramidal downwardly and forwardly inclined tooth extending downwardly and forwardly from said mount, the angles of inclination of the shank, the mount and the tooth being substantially the same with their longitudinal axes in substantial alignment, said tooth having a leading apex and a trailing end; and means releasably attaching the tooth to said mount.

2. The invention of claim 1; and shoulder means on said mount abutting said end.

3. The invention of claim 1, said attaching means extending transversely through the mount and the tooth.

4. The invention of claim 1; and a tongue and socket interlock between the mount and the tooth, said attaching means including a fastener traversing the tooth and extending through the tongue and the socket.

5. The invention of claim 4, said tongue being appreciably narrower than the mount.

6. The invention of claim 4; and shoulder means on said mount abutting said end and disposed to preclude a tight fit of the tongue in the socket whereby to absorb rearward forces to which the tooth is subjected during use and thereby protect the fastener against shearing.

7. The invention of claim 6, said trailing end extending upwardly beyond the top of the mount at said shoulder means and downwardly at said shoulder means beyond the mount.

8. The invention of claim 1, said securing means being releasable; and a removable, wedge-shaped shim adapted to be clamped between the mount by said securing means and the shank for varying the pitch of said tongue.

9. The invention of claim 1, said tooth being spaced in its entirety downwardly and forwardly of said terminus.

10. The invention of claim 1; and a pair of opposed, laterally extending, flat, inclined, triangular wings integral with the tooth and extending from the apex to said end.

11. The invention of claim 1, said tooth having a lower, flat, triangular rearwardly facing, end portion below the mount.

12. The invention of claim 11, said tooth having a pair of opposed, triangular, lower bevels terminating in a straight, lower edge extending from the apex to said end portion and merging with the latter into a pointed corner.

* * * * *